United States Patent [19]
Muthal et al.

[11] Patent Number: 5,815,167
[45] Date of Patent: *Sep. 29, 1998

[54] METHOD AND APPARATUS FOR PROVIDING CONCURRENT ACCESS BY A PLURALITY OF AGENTS TO A SHARED MEMORY

[75] Inventors: Manish Muthal; Nilesh V. Shah; Kuljit Bains, all of Folsom, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 672,099

[22] Filed: Jun. 27, 1996

[51] Int. Cl.⁶ .................................................. G06F 15/167
[52] U.S. Cl. ........................................... 345/512; 345/511
[58] Field of Search ..................................... 395/501, 502, 395/508, 512, 515, 201, 511

[56] References Cited

U.S. PATENT DOCUMENTS

| | | | |
|---|---|---|---|
| 4,156,904 | 5/1979 | Minowa et al. | 395/503 |
| 4,980,828 | 12/1990 | Kapcio et al. | 364/413 |
| 5,450,542 | 9/1995 | Lehman et al. | 395/512 |
| 5,459,846 | 10/1995 | Hyatt | 395/421.02 |
| 5,659,715 | 8/1997 | Wu et al. | 395/497.01 |

*Primary Examiner*—Raymond J. Bayerl
*Assistant Examiner*—Cao H. Nguyen
*Attorney, Agent, or Firm*—Blakely, Sokoloff, Taylor & Zafman

[57] ABSTRACT

A computer system, including a graphics controller and a memory controller, employs a Shared Frame Buffer Architecture, and accordingly has a shared memory in the form a bank of DRAMs. The shared memory is accessible by both the memory and graphics controllers. The memory includes a shared DRAM row in which a Shared Frame Buffer (SFB) aperture is defined. An interface selectively provides access to the shared DRAM row by the graphics or memory controller, while providing permanent access to the remaining DRAM rows by the memory controller. This facilitates concurrent access by the graphics controller and the memory controller to the shared DRAM row and to the remaining DRAM rows respectively, in a first memory access scenario. The accessibility of the shared DRAM row by the memory controller, in a second memory access scenario, is also maintained. The interface includes a selector circuit, such as a multiplexor or Q-switch, coupled to receive memory address signals and control signals from the graphics controller and the memory controller via a dedicated bus from each of these controllers. The selector circuit is operable selectively to present either memory address to the shared DRAM row, in which the SFB aperture is defined, and also selectively to provide access to the shared DRAM row by either controller. The selector circuit is operable by a logic circuit, incorporated within the systems controller, which determines whether a memory access request received from the memory controller is to an address in the shared DRAM row, or in the remaining DRAM rows.

16 Claims, 5 Drawing Sheets

METHOD AND APPARATUS FOR PROVIDING CONCURRENT ACCESS BY A PLURALITY OF AGENTS TO A SHARED MEMORY

FIELD OF THE INVENTION

The present invention pertains to the field of computer systems. More particularly, the present invention relates to a computer system that employs a memory controller and a graphics controller which share a memory resource.

BACKGROUND OF THE INVENTION

A number of computer systems employing a microprocessor utilize a memory controller and a graphics controller. The memory controller controls access by the microprocessor, and other peripheral integrated circuits, to system memory. The graphics controller controls the display of data provided by the microprocessor onto a display screen, such as a cathode ray tube (CRT) using a frame buffer. Both the system memory and the frame buffer are typically implemented using arrays of Dynamic Random Access Memory (DRAM). In a number of prior art systems, the memory controller has exclusive access to the system memory, and the graphics controller similarly has exclusive access to the frame buffer.

In order to contain costs, a number of computer systems have recently incorporated the frame buffer and the system memory into a unified or shared memory, thus allowing manufacturers of computer equipment to reduce costs by eliminating the need for a separate memory for the frame buffer. Incorporating the frame buffer and the system memory within a shared memory is furthermore desirable, as it allows unused portions of the frame buffer to be employed as system memory when all, or even a portion, of the frame buffer is not in use. Such efficiency cannot easily be achieved with a separate frame buffer controlled by a graphics controller.

An example of a computer system architecture wherein the frame buffer and the system memory are realized within a shared memory resource, is the Shared Memory Buffer Architecture (SMBA), (also known as Unified Memory Architecture (UMA)) of Intel Corporation, of Santa Clara, Calif.

A shared memory architecture as discussed above is implemented by providing an array of DRAM accessible by both the memory controller and the graphics controller, the associated memory space of the DRAM array being partitioned between system memory and the frame buffer. In such a computer system, the memory controller typically has access to all of the shared memory, including the portion designated as the frame buffer. Accordingly, if the frame buffer is not required, the memory controller may access that portion of memory designated as the frame buffer, and utilize that portion of the memory as system memory. Because the DRAM array is shared by the memory controller and the graphics controller, an arbitration unit (or arbiter) is typically provided in computer systems employing a shared memory configuration to ensure fair and efficient access to the DRAM array by both the memory controller and the graphics controller.

While the implementation of a shared memory configuration provides a number of cost benefits, such memory configurations suffer from a lowered memory bandwidth, as the shared memory is no longer a dedicated resource of either the graphics controller or the memory controller. While system performance is not significantly affected when performing applications which are not graphic-intensive, the system performance can suffer significantly when the computer system is executing a graphic-intensive application, such as a multi-media application. In such cases, the graphics controller and the memory controller contend strongly for access to the shared memory. Graphics controller access to the shared memory for extended periods may decrease accessibility of the system memory by the memory controller by up to fifty percent. As a result, performance of the computer system may suffer significantly.

The present invention seeks to address the performance penalties resulting from a shared memory configuration as discussed above.

SUMMARY OF THE INVENTION

According to a first aspect of the invention there is provided a computer system including a memory controller and a graphics controller. In one embodiment, the computer system employs a Shared Frame Buffer Architecture, and accordingly has a shared memory in the form of a bank of DRAMs. The shared memory is accessible by both the memory and graphics controllers. The shared memory includes at least one shared DRAM row in which a Shared Frame Buffer (SFB) aperture is defined. An interface selectively provides access to the SFB aperture by the graphics controller or the memory controller. This facilitates concurrent access to the SFB aperture by the graphics controller, and to the remaining DRAM rows by the memory controller while maintaining the accessibility to the at least one shared DRAM row by the memory controller. To reduce the likelihood of contention for access to the at least one shared DRAM row, the SFB aperture is preferably defined at a low memory location within the shared memory.

The interface includes a selector circuit, such as, for instance, a multiplexer or Q-switch, coupled to receive respective memory address and control signals from the graphics controller and the memory controller, via a dedicated bus from each of these controllers. The selector circuit is operable selectively to present either memory address to the shared DRAM row, in which the SFB aperture is defined, and also selectively to provide access to the shared DRAM row by either controller over a data bus. The selector circuit receives a control input from a logic circuit, which determines whether a memory access request received from the memory controller is to an address in the at least one shared DRAM row, or to an address in the remaining DRAM rows.

According to a second aspect of the invention there is provided a method of providing concurrent access by a graphics controller and a memory controller to a shared memory, the shared memory including a first memory portion and a second memory portion. The first memory portion, which may be single DRAM row, incorporates a Shared Frame Buffer (SFB) aperture. On receiving a request to access a first memory address in the first memory portion from the graphics controller, access to the first memory portion is granted to the graphics controller. Should a request to access a second memory address be received from the memory controller, a determination is made as to whether the second memory address is located in the first or second memory portions of the shared memory. Access to the second memory address is then granted to the memory controller if the second memory address is located in the second memory portion, so as to facilitate concurrent access by the graphics controller and the memory controller to the first and second memory portions respectively. On the other hand, if the second memory address is located in the first memory portion, access to the first memory portion by the memory controller is denied, or the contending requests for access to the first memory portion by the graphics and memory controllers are presented to an arbitration unit for arbitration.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for providing concurrent access by a plurality of agents to a shared memory is described. In the following description, for purposes of explanation, numerous specific details are set forth in order to provide a thorough understanding of the present invention. It will be evident, however, to one skilled in the art that the present invention may be practiced without these specific details.

Figure 1:
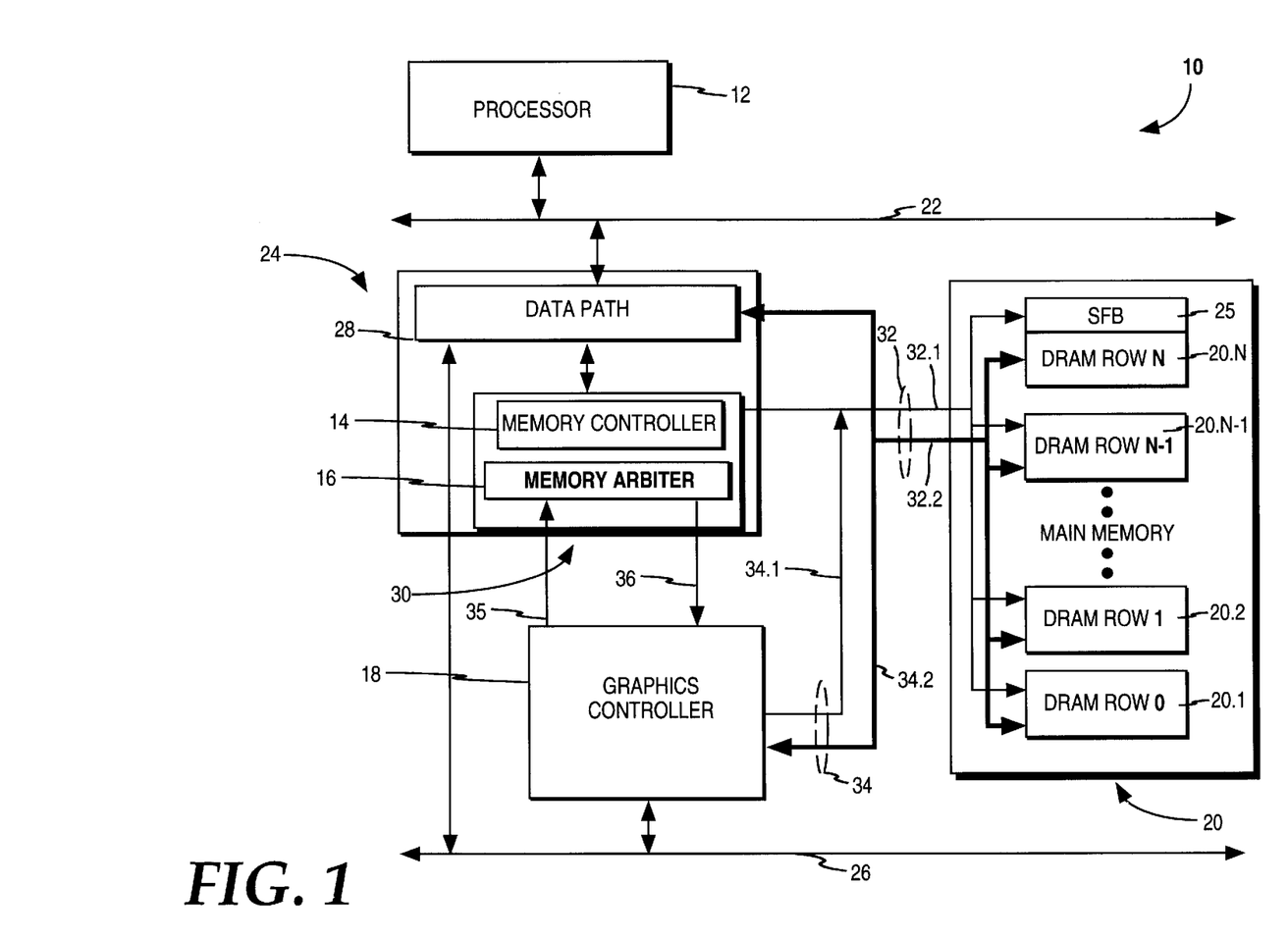
FIG. 1 is a block diagram showing a computer system in which the present invention can be implemented.

Referring firstly to FIG. 1 there is shown, in the block diagram form, a computer system 10 having as its principle components a processor 12, a memory controller 14, a memory arbitration unit 16, a graphics controller 18, and a shared memory 20. The processor 12 executes various instructions and is coupled to a host bus 22. A bus bridge 24 facilitates communication between the host bus 22 and a peripheral bus 26. The peripheral bus 26 may be operated according to the Peripheral Components Interconnect (PCI) Local Bus Specification Revision 2.1 published Jun. 1, 1995, in which case the bus bridge 24 is a Host-to-PCI bridge. The bus bridge 24 includes a data path unit 28 and a system controller 30. The memory controller 14 and the memory arbitration unit 16 are implemented within the system controller 30. In one embodiment, the data path unit 28 comprises a 82438VX data path unit, and the system controller 30 comprises a 82437VX system controller, both of which are manufactured by Intel Corporation of Santa Clara, Calif. The memory controller 14 and the memory arbitration unit 16 need not be implemented within a system controller, and may be independent functional units within the computer system 10. The bus bridge 24 is coupled to the shared memory 20 by a dedicated memory bus 32. The memory bus 32 comprises control and address lines 32.1 and data lines 32.2. More specifically, control signals provided by the memory controller on the lines 32.1 include a Write Enable signal (WE), a Row Access Strobe signal (RAS#), and a Column Address Strobe signal (CAS#). The memory controller 14 drives a Memory Address signal (MA) onto the control and address lines 32.1. Data is transferred to and from the shared memory 20 on the 64-bit data lines 32.2.

The graphics controller 18 is similarly coupled to the shared memory 20 by a bus 34, which comprises control and address lines 34.1, which are connected to the control and address lines 32.1 of the memory bus 32, and data lines 34.2, which are similarly connected to the data lines at 32.2.

The shared memory 20 is shown to comprise N rows of DRAM 20.1 to 20.N, each row of DRAM being coupled to receive control and address signals on lines 32.1 of the memory bus 32, and to receive and to output data on data lines 32.2 of the memory bus 32. Each row of DRAM can accordingly be accessed by either the memory controller 14 or the graphics controller 18, depending on which of these agents has control of the memory bus 32. DRAM row 20.N is shown to incorporate a shared frame buffer aperture 25, the frame buffer aperture 25 being designated for use by the graphics controller 18. The frame buffer aperture 25 is located at the top of the system memory 20 reported to the operating system, and memory above the frame buffer 25 may never be allocated by the operating system. It will be appreciated that the size and location of the frame buffer 25 within the shared memory 20 are definable and can be modified depending on the requirements of the computer system 10. Note that only a single set of control and address lines 32.1 and data lines 32.2 connect the shared memory 20 to the other components of the computer system 10 through a single port interface.

The memory controller 14 is coupled to receive memory access requests from a number of components within the computer system 10, such as the processor 12, PCI masters and expansion bus bridges. The memory controller 14 may then read data from, or write data to, the shared memory 20 in response to such memory access requests. For some operations, such as a DRAM refresh, the memory controller 14 acquires access to all portions of the shared memory 20. For other operations, such as memory access requests, the memory controller 14 is only required to access the system memory portion (i.e. addressable memory that has not been allocated to the shared frame buffer aperture 25 within the shared memory 20). For still other operations, the memory controller 14 may be required to access the shared frame buffer aperture 25.

The graphics controller 18 accesses the shared frame buffer aperture 25 within the shared memory 20 for the purposes of storing and retrieving graphics data therein for ultimate display on a display device (not shown), such as a cathode ray tube (CRT) or a liquid crystal display (LCD), which is coupled to the peripheral bus at 26. The graphics controller 18 is coupled to the peripheral bus 26, and receives graphics, data and commands via the peripheral bus 26. Such graphics, data and commands originate from the processor 12, or a number of other devices or components connected to the peripheral bus 26, in a manner well known in the art.

It will be appreciated that both the graphics controller 18 and the memory controller 14 access the shared memory 20 via the single memory bus 32. The arbitration unit 16, also termed a "memory arbiter", is provided for coordinating access to the memory bus 32 by the memory controller 14 and the graphics controller 18. More specifically, the arbitration unit 16 receives memory access requests from both the memory controller 14 and the graphics controller 18, determines the relative priority of these access requests, and then grants access to a particular agent, or device, depending on the relative priorities of the requests. In one embodiment, the memory controller 14 is granted default control of the memory bus 32 to access the shared memory 20. The arbitration unit 16 is coupled to receive a memory bus request signal (MREQ#) via line 35 from the graphics controller 18, which indicates to the arbitration unit 16 that the graphics controller 18 desires access to the memory bus 32. The arbitration unit 16 then arbitrates between the access request of the graphics controller 18 and contending access requests from the memory controller 14. If the arbitration unit 16 determines that the graphics controller 18 is to be given access to the shared memory 20, the arbitration unit 16 asserts a memory bus grant signal (MGNT#) on line 36. A memory arbitration protocol under which the arbitration unit 16 may function is described in U.S. patent application Ser. No. 08/516,495, entitled "Method and Apparatus for Arbitrating Access Requests to a Shared Computer System Memory by a Graphics Controller and a Memory Controller", filed Aug. 17, 1995, and assigned to the assignee of the present invention.

Furthermore, while the arbitration unit 16 is shown to be incorporated within the system controller 30, the arbitration unit 16 could be implemented as a separate circuit.

In the computer system 10 described above, access requests from the graphics controller 18 contend with memory access requests from the memory controller 14, which in turn may originate from a number of other components within the computer systems 10. It is furthermore important to note that the graphics controller 18 in fact only requires access to the single DRAM row 20.N incorporating the shared frame buffer 25. To acquire such access, the graphics controller 18 must have control of the single memory bus 32. Accordingly, when the graphics controller 18 has control of the memory bus 32, the memory controller 14 is precluded from issuing access requests originating within itself or received from any one of a number of other devices. Accordingly, system performance penalties may be suffered as a result of the lowered memory bandwidth resulting from the shared memory configuration.

Figure 2:
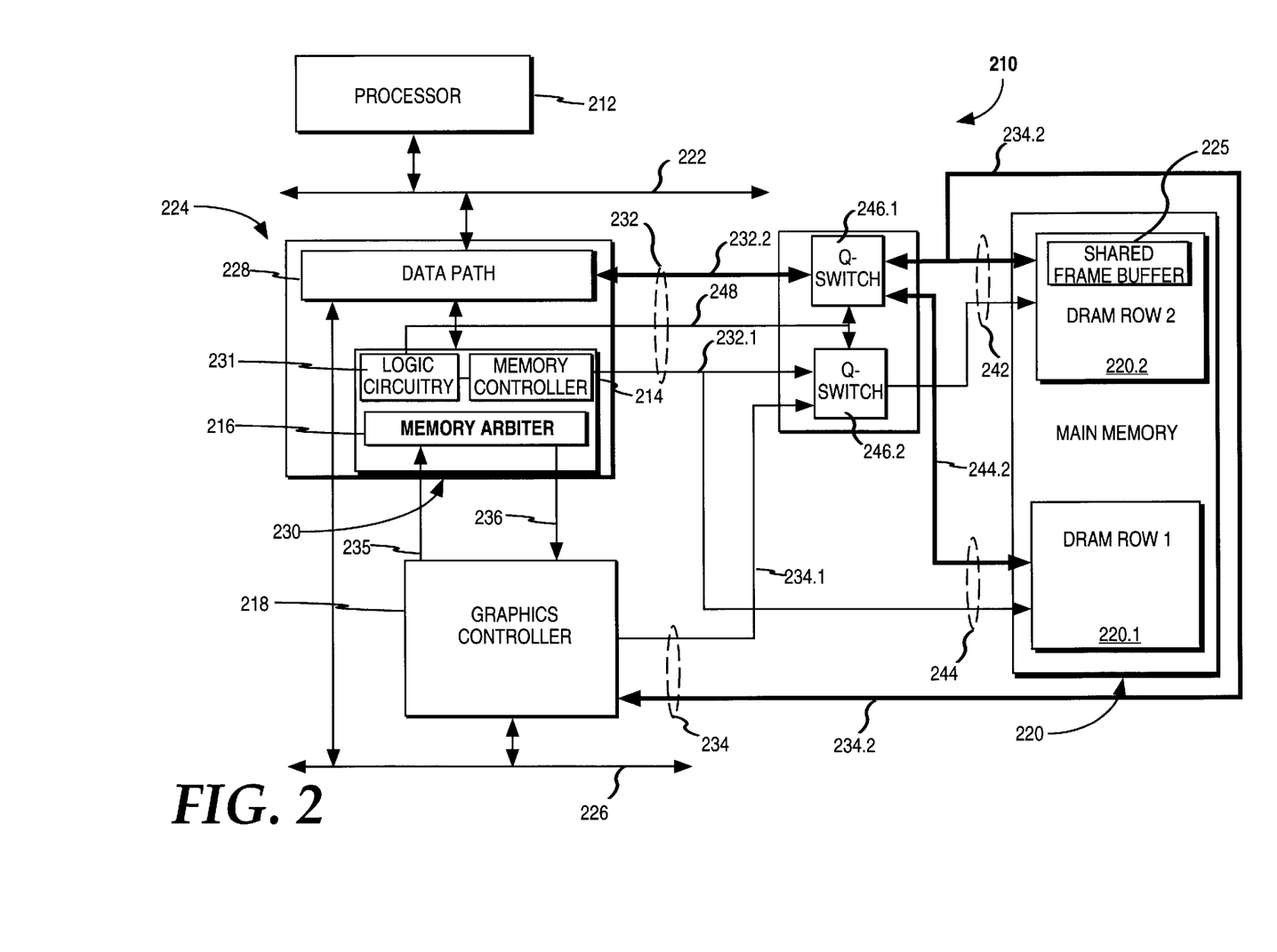
FIG. 2 is a block diagram illustrating a computer system incorporating a first embodiment of the present invention.

Turning now to FIG. 2, there is shown a computer system 210 for implementing a method of providing concurrent access by at least two agents, such as a memory controller 214 and a graphics controller 218 to a shared memory 220. For the purposes of clarification, the shared memory 220 is shown to include only two memory portions, in the form of DRAM rows 220.1 and 220.2. A shared frame buffer aperture 225 is implemented in DRAM row 220.2. As with the computer system described above with reference to FIG. 1, the computer system 210 comprises a processor 212 coupled to a host bus 222, which communicates with a peripheral bus 226 via a bus bridge 224. The bus bridge 224 incorporates a data path unit 228 and a system controller 230, in which the memory controller 214 and a memory arbitration unit 216 may be implemented. The arbitration unit 216 receives memory request signals (MREQ#) via line 235 from the graphics controller 218 and issues memory access grant signals (MGNT#) on line 236.

The computer system 210 furthermore incorporates an interface 240 coupled between the shared memory 220, and the bus bridge 224 and the graphics controller 218. The interface 240 is coupled to the memory bus 232, which comprises control and address lines 232.1 and data lines 232.2. The interface 240 is also coupled to a frame buffer bus 234, comprising control and address lines 234.1 and data lines 234.2. The interface 240 is furthermore coupled to the shared memory 220 by two further buses, namely buses 242 and 244. As illustrated in FIG. 2, the bus 242 is dedicated to addressing and providing access to the DRAM row 220.2, which includes the shared frame buffer aperture 225. The bus 244 provides access to the remaining rows of DRAM within the shared memory 220, which in the illustrated example comprises only DRAM row 220.1.

In one embodiment, the interface 240 comprises a selector arrangement in the form of a pair of Q-switches 246.1 and 246.2. The Q-switch 246.2 is coupled to receive inputs from control and address lines 232.1 and 234.1 and Q-switch 246.1 is coupled to data lines 232.2 and 234.2. The pair of Q-switches are switched by a signal generated on line 248 by the system controller 230. More specifically, the system controller 230 incorporates logic circuitry 231 for examining memory access requests from the memory controller and generating appropriate signals on the line 248, as is described in more detail below. It will be appreciated that the logic circuitry 231 could be included within any functional unit within the system controller 230, or could be realized outside the system controller 230 as an independent functional unit or circuit. The logic circuitry 231 could conveniently also be located within the interface 240 itself.

The interface 240 facilitates concurrent access by the memory controller 214 and the graphics controller 218 to the shared memory 220 when the memory controller 214 requests access to a memory location in a first portion of the shared memory 220, namely DRAM row 220.1, and when the graphics controller 218 requests access to a memory location in a second portion of the shared memory 220, namely DRAM row 220.2. Should the memory controller 214 require access to a memory location in DRAM 220.1, the switches 246.1 and 246.2 within the interface 240 are switched to a first state, by asserting an appropriate signal on line 248, this signal having been generated by the logic circuitry 231 incorporated within the system controller 230. Q-switch 246.1 provides a data path between data lines 244.2 and 232.2, so as to allow data to be propagated between the data path unit 228 and DRAM row 220.1. The memory controller 214 is able to address DRAM row 220.1 via control and address line 244.2. Similarly, Q-switch 246.2 creates a signal path between control and address line 234.1 and 242.1, so as to allow the graphics controller 218 to control and access DRAM row 220.2. The data can then be propagated between DRAM row 220.2 and the graphics controller 218 via data lines 234.2. In this way, when graphics controller 218 is accessing DRAM row 220.2, memory controller 214 is concurrently able to access DRAM row 220.1. Similarly, when memory controller 214 is accessing DRAM row 220.1, graphics controller 218 is concurrently able to access the shared buffer aperture 222 in DRAM row 220.2.

It will be appreciated that a portion of DRAM row 220.2 comprises system memory and thus memory controller 214 requires access to DRAM row 220.2, and conflicting requests from the memory controller 216 and the graphics controller 218 for access to DRAM row 220.2 may be generated. Arbitration unit 216 then performs an arbitration protocol and grants access to the appropriate controller by placing the Q-switches 246.1 and 246.2 in appropriate states. Thus, concurrent access is not facilitated, as the memory access requests from the graphics and memory controllers are to the same DRAM row 220.2. It will be appreciated that the Q-switches 246.1 and 246.2, which may be implemented as unidirectional or bi-directional field effect transistors (FETs), may be substituted by any suitable selector means, such as multiplexors, or tri-state buffers.

Figure 3:
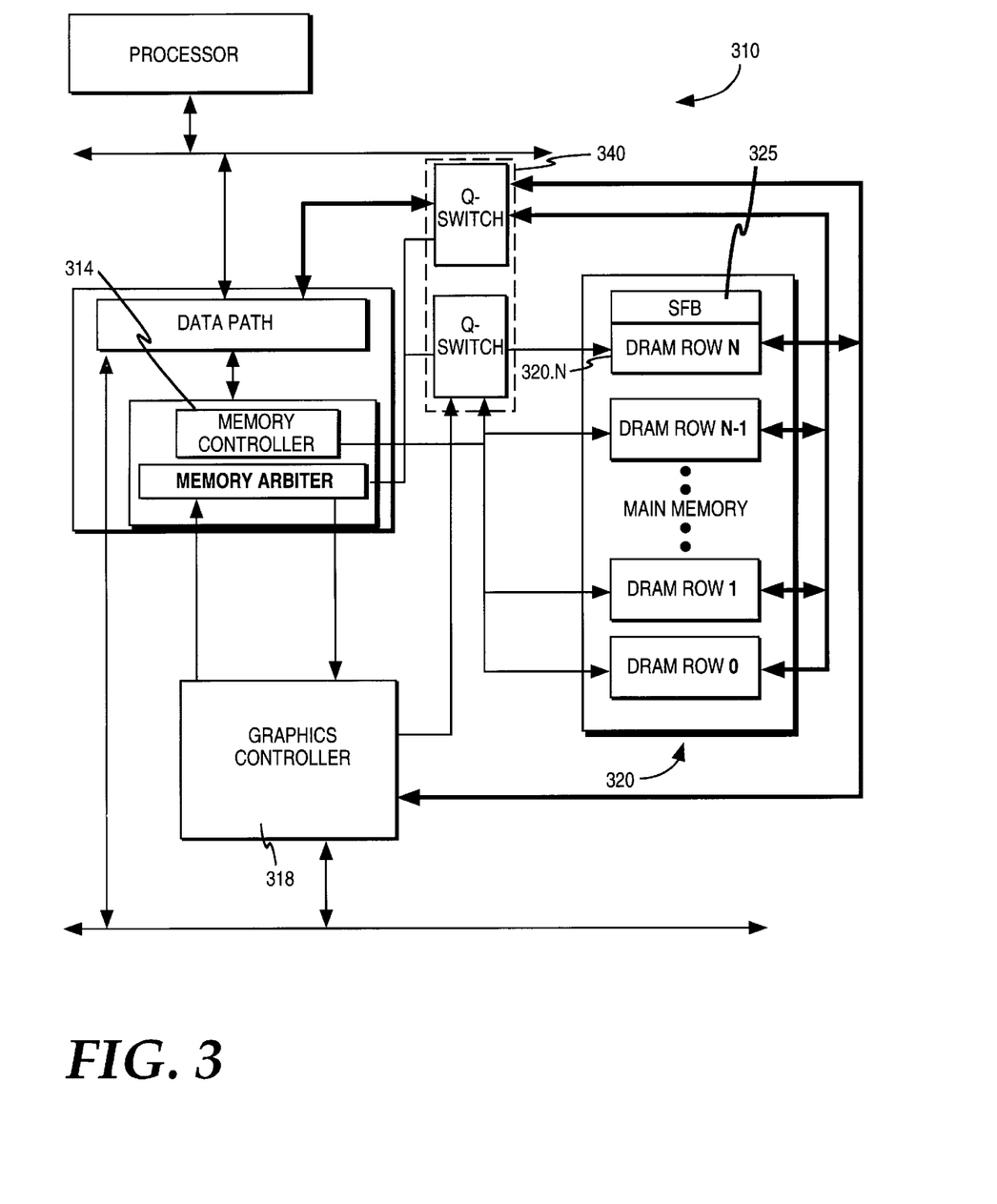
FIG. 3 is a block diagram illustrating a computer system incorporating a second embodiment of the present invention.

The present invention is not limited to a shared memory 220 incorporating only two DRAM rows. An alternative embodiment of the present invention is shown in FIG. 3. The shared memory 320 of a computer system 310 incorporates N DRAM rows, with the shared frame buffer aperture 325 being implemented in DRAM row 320.N. A row of DRAMs can be implemented using various combinations of DRAM banks. For example, a row of DRAM could compare a single 8 MB bank, or alternatively, two 4 MB banks. Applying the principals described above with reference to FIG. 2, it will be appreciated that an interface 340 is coupled to facilitate concurrent access by a graphics controller 318 to DRAM row 320.N and by a memory controller 314 to any of the other DRAM rows within the shared memory 320. The interface 340 accordingly views the shared memory 320 as being divided into two portions, namely DRAM row 320.N which incorporates the shared frame buffer aperture 322, and the remaining DRAM rows.

Figure 4:
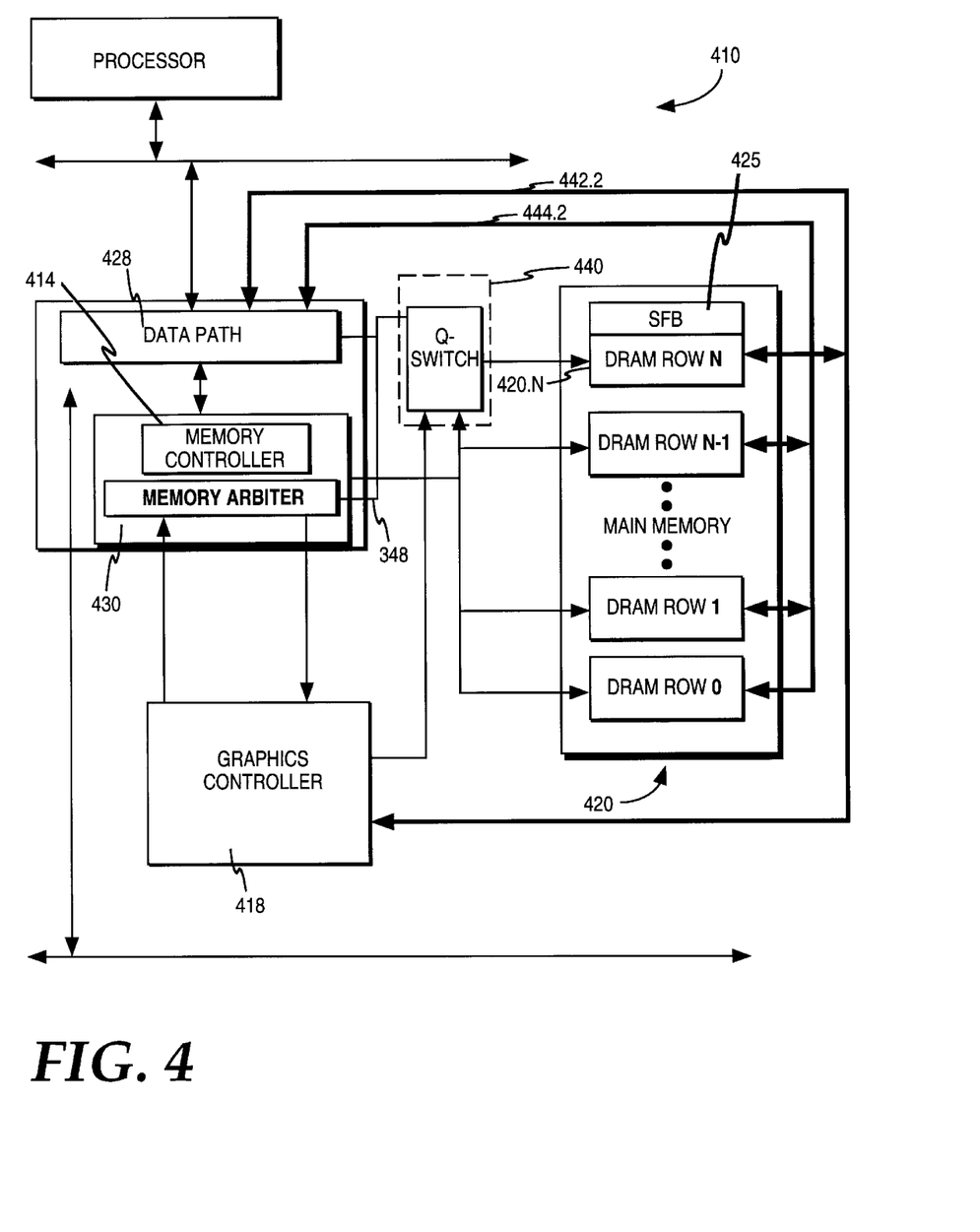
FIG. 4 is a block diagram illustrating a computer system incorporating a third embodiment of the present invention.

FIG. 4 shows a further alternative embodiment of the present invention, wherein the computer system 410 incorporates a 128-bit data path unit 428, which is coupled to receive and transmit data on the 64-bit data lines 442.2 and 444.2, thus obviating the need for two Q-switches within an interface unit 440. The data path unit 428 is coupled to receive a select signal 348 from system controller 430, thus allowing the data path unit 428 selectively to establish a data path between an external device and either the DRAM row 420.N incorporating the shared frame buffer aperture 422, or any of the other DRAM rows within the shared memory 420. The shared frame buffer 422 furthermore need not be located at the top of system memory, as illustrated in FIG. 4. As operating system loads and accesses are often to memory addresses located at or adjacent the top of the memory, it is desirable to locate the shared frame buffer 422 at a memory location just above the DOS application region within the memory 420. By locating the shared frame buffer 422 at a lower location within the memory 420, the probability of the memory controller 414 and the graphics controller 418 requesting access to the same DRAM row is lessened. Accordingly, the concurrent access capability of the present invention can be more fully utilized.

The above described embodiments have focused on providing concurrent access to a shared memory incorporating a Shared Frame Buffer (SFB) by a graphics controller and a memory controller. It will be appreciated that other buffers could also be implemented within a shared memory, such as a so-called "Alpha Buffer" and a "Z Buffer", which contain information relating to the display of three-dimensional graphics. Accordingly, the teachings of the present invention can be extended to include providing concurrent access to a shared memory resource incorporating the above buffers. Furthermore, this concurrent access could be provided to other types of controllers, and to more than only two controllers or agents.

It will also be appreciated that the Shared Frame Buffer (SFB) need not be located within a single DRAM row as discussed above, but could be fragmented and located on a plurality of DRAM rows. In this case, the teachings of the present invention can be extended to provide concurrent access by a graphics controller to those DRAM rows in which the SFB resides, and by the memory controller to the other DRAM rows.

Figure 5:
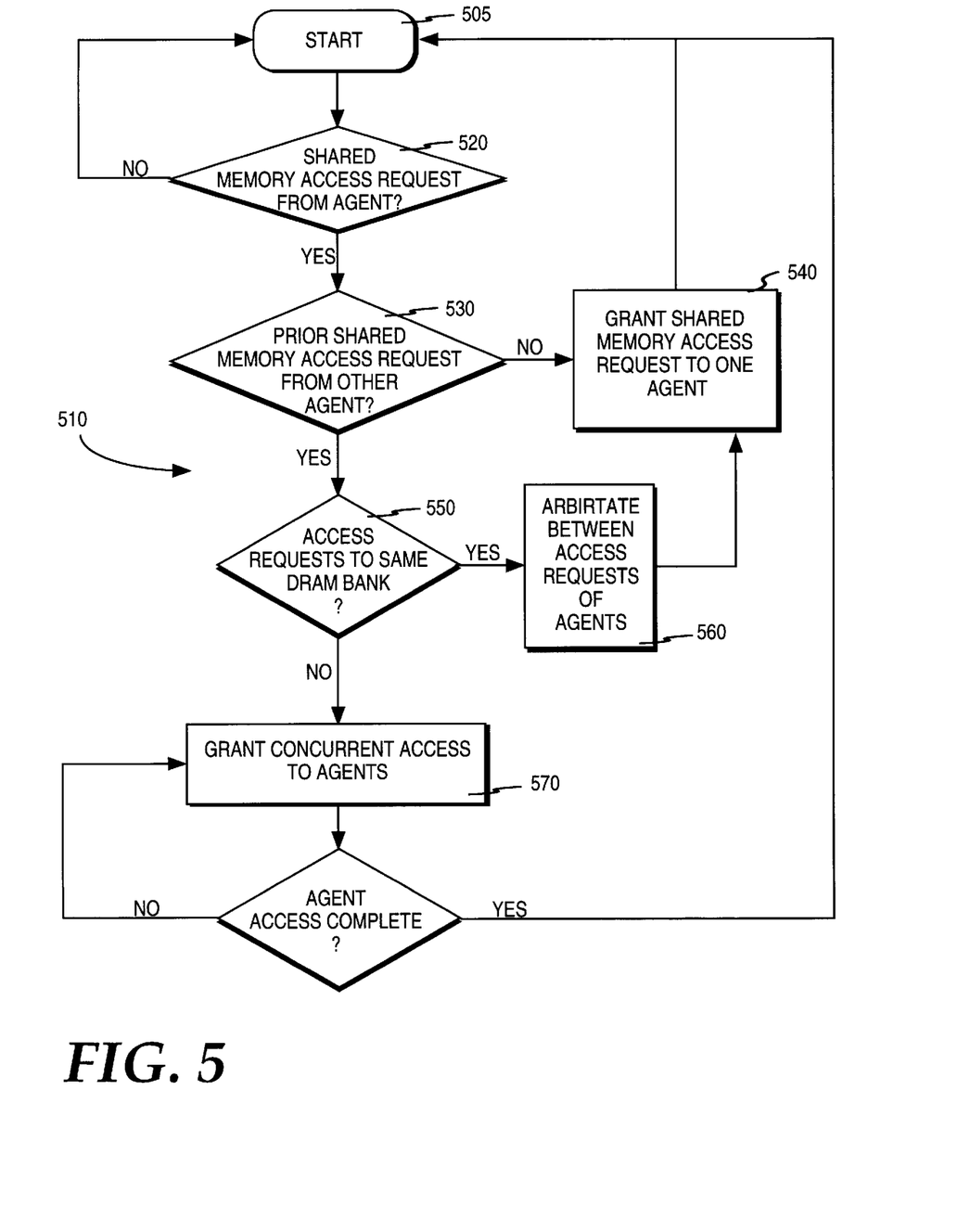
FIG. 5 is a flowchart illustrating a method of providing concurrent access by first and second agents to a shared memory according to the invention.

A method 510 of providing concurrent access by first and second agents, such as a graphics controller and a memory controller, to a shared memory will now be discussed with reference to FIGS. 5 and 6. Firstly, at step 520, it is determined whether a shared memory access request has been received from an agent, such as, for example, the graphics controller. If no access request has been received, then the method loops to step 505. On the other hand, should a shared memory access request have been received from the graphics controller, the method proceeds to step 530, where processing logic determines whether a prior request has been received from another agent, such as the memory controller. If no prior request has been received from the memory controller, the method proceeds to step 540 and memory access granted to the graphics controller. If the processing logic determines at step 530 that a prior memory access request has in fact been received from the memory controller, the method proceeds to step 550, where it is determined whether the graphics controller access request is to a memory address within the same DRAM row as the address of the memory access requests received from the memory controller. If the memory access requests of the respective controllers are to memory addresses within the same DRAM row, the method proceeds to step 560 for arbitration between the access requests. On completion of arbitration, an arbitrator unit will grant access to either the graphics controller or the memory controller at step 540. Alternatively, if at step 550, it is determined that the graphics controller access request is to a memory location not within the same DRAM row, concurrent access to the shared memory is granted to both controllers at step 570.

The present invention provides a number of advantages over prior art computer systems employing a shared memory. Most significantly, the present invention increases the effective memory bandwidth of a computer system with a shared memory, by allowing concurrent access to the shared memory by at least two agents, such as a graphics controller and a memory controller. The total system performance is thus comparable to that of a computer system having a dedicated memory resource for each of the requesting agents, whereas the costs benefits resulting from a shared memory are maintained. This advantage is achieved by increasing the granularity, or resolution, with which agents can access a shared memory resource. Thus, memory access contention between two agents is reduced to contention for individual memory rows, as opposed to contention for the entire shared memory. The ability of the present invention to provide a shared memory at a lower granularity is accomplished in part by providing separate control inputs to first and second portions of the shared memory. More specifically, the present invention proposes providing a dedicated memory bus for a row of DRAM incorporating a shared buffer aperture, and a dedicated memory bus for the rest of the rows of DRAM. The present invention also ensures a full 64-bit interface with the shared memory without increasing the pin count of a data path unit.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A computer system comprising:

first and second agents;

a shared memory accessible by the first and second agents, the shared memory having a first memory portion and a second memory portion, at least a portion of the second memory portion to store data associated exclusively with the second agent; and a switch arrangement to provide (i) a first data path between the first agent and the second memory portion when in a first state, and to provide (ii) a second data path between the first agent and the first memory portion and (iii) a third data path between the second agent and the second memory portion when in a second state, the second and third data paths being distinct and provided in parallel so as to facilitate simultaneous access to the first and second memory portions by the first and second agents respectively when the switch arrangement is in the second state.

2. The computer system of claim 1 wherein the switch arrangement is coupled to receive first and second memory addresses from the first and second agents respectively, and operable selectively to provide the first memory address to the second memory portion when in the first state, and to provide the second memory address to the second memory portion when in the second state.

3. The computer system of claim 2 including a logic circuit for determining whether the first memory address received from the first agent is in the first memory portion and, if so, configuring the switch arrangement to operate in the second state.

4. The computer system of claim 1 wherein the first agent is a memory controller and the second agent is a graphics controller.

5. The computer system of claim 1 wherein the shared memory comprises a plurality of rows of random access memory (RAM), and wherein the first memory portion comprises a first row of RAM, and the second memory portion comprises a second row of RAM.

6. The computer system of claim 5 wherein the second row of RAM incorporates a frame buffer aperture.

7. The computer system of claim 6 wherein the frame buffer aperture is located in a low memory address range within the shared memory.

8. An interface arrangement for a shared memory, the shared memory having first and second memory portions, the interface comprising:

a first input coupled to receive a first memory address from a first agent;

a second input coupled to receive a second memory address from a second agent;

a selector operable selectively to present the second memory address to the second memory portion when in a first state so as to facilitate simultaneous access by the first agent to the first memory portion via a first access path and by the second agent to the second memory portion via a second access path and selectively to present the first memory address to the second memory portion when in a second state so as to facilitate exclusive access by the first agent to at least the second memory portion via a third access path, the first and second access paths being distinct and existing in parallel to facilitate the simultaneous access.

9. The interface arrangement of claim 8 wherein the selector is coupled to be operable by logic circuitry to determine whether a memory address presented to the logic circuitry by the first agent is located in either the first or second memory portion.

10. The interface arrangement of claim 8 wherein the selector includes a first switch coupled to receive address and control inputs from the first and second agents and operable selectively to provide address and control input from the first agent to the second memory portion when the selector is in the second state, and to the first memory portion when the selector is in the first state.

11. The interface arrangement of claim 10 wherein the selector includes a second switch operable selectively to receive data from, and transmit data to, either the first or the second memory portion.

12. A method of facilitating simultaneous access by first and second agents to a shared memory via a memory interface, the shared memory including first and second memory portions, the method including the steps of:

(a) receiving a memory access request from the first agent;

(b) determining whether the memory access request of the first agent is to a memory location in the first or second memory portion of the shared memory;

(c) if the memory access request of the first agent is to a memory location in the first memory portion, placing the memory interface in a first state in which the first agent has access to the first memory portion via a first access path and in which the second agent is able to access the second memory portion via a second access path, the first and second access paths being distinct and existing in parallel to facilitate simultaneous access by the first and second agents to the first and second memory portions respectively; and (d) if the memory access request of the first agent is to a memory location in the second memory portion, placing the memory interface in a second state in which the first agent has exclusive access to at least the second memory portion via a third access path.

13. The method of claim 12 wherein only the second memory portion of the shared memory is shared by the first and second agents, and wherein the method includes the steps of:

if the memory access request of the first agent is to a memory location in the second memory portion, determining whether a memory access request to a memory location in the second memory portion from the second agent is outstanding; and if a memory access request from the second agent is outstanding, arbitrating between the access requests of the first and second agents.

14. The method of claim 12 including the steps of:

receiving a memory access request from the second agent to a memory location in the second memory portion of the shared memory;

determining whether the first agent is accessing a memory location in the second memory portion; and if the first agent is not accessing the second memory portion, then placing the memory interface in the first state and granting the second agent access to the second portion so that the first agent is simultaneously able to access the first memory portion.

15. The method of claim 14 including the step of denying the second agent access to the second portion if the first agent is accessing a memory location in the second memory portion.

16. The method of claim 14 including the step of arbitrating between the access requests of the first and second agents if the first agent is accessing a memory location in the second memory portion.

* * * * *